(12) United States Patent
Okubo et al.

(10) Patent No.: US 6,646,978 B2
(45) Date of Patent: Nov. 11, 2003

(54) OPTICAL STORAGE MEDIUM WITH IMPROVED SUBSTRATE STRUCTURE TO PROVIDE UNIFORM SIGNAL QUALITY

(75) Inventors: Shuichi Okubo, Tokyo (JP); Tatsunori Ide, Tokyo (JP)

(73) Assignee: NEC Corporation, Tokyo (JP)

(*) Notice: Subject to any disclaimer, the term of this patent is extended or adjusted under 35 U.S.C. 154(b) by 117 days.

(21) Appl. No.: 09/956,456

(22) Filed: Sep. 20, 2001

(65) Prior Publication Data

US 2002/0034153 A1 Mar. 21, 2002

(30) Foreign Application Priority Data

Sep. 20, 2000 (JP) ........................... 2000-286099

(51) Int. Cl.$^7$ ................................. G11B 7/24
(52) U.S. Cl. ..................... 369/275.4; 428/64.4
(58) Field of Search .................. 369/275.4, 275.1, 369/275.2, 13.55, 109.02, 277, 279, 275.3, 283, 275.5; 428/64.1, 64.4, 64.5

(56) References Cited

U.S. PATENT DOCUMENTS 6,287,660 B1 * 9/2001 Hosaka et al. ............. 428/64.1
6,400,677 B2 * 6/2002 Kagawa et al. ........... 369/275.4
6,452,899 B1 * 9/2002 Fujii et al. ................ 369/275.4

FOREIGN PATENT DOCUMENTS

JP      5/282705    10/1993

* cited by examiner

*Primary Examiner*—Ali Neyzari
(74) *Attorney, Agent, or Firm*—Young & Thompson

(57) ABSTRACT

An optical storage medium includes a substrate having grooves and lands. A first dielectric layer overlies the substrate. A recording layer overlies the first dielectric layer. A second dielectric layer overlies the recording layer, and a light transmitting layer overlying the second dielectric layer. Each of the grooves is larger in width than adjacent two of the lands.

18 Claims, 7 Drawing Sheets

110a = 110b    111a < 111b $20b < 20a \quad 21a = 21b$

OPTICAL STORAGE MEDIUM WITH IMPROVED SUBSTRATE STRUCTURE TO PROVIDE UNIFORM SIGNAL QUALITY

BACKGROUND OF THE INVENTION

1. Field of the invention

The present invention relates to a storage medium for storing informations, and more particularly to an optical storage medium for storing and reproducing informations upon irradiation of a laser beam.

2. Description of the Related Art

An optical disk comprises a substrate, an optical recording layer overlying the substrate, and an light transmitting layer overlying the optical recording layer.

It is desirable to improve a recording density of the optical disk which includes lands and grooves. Japanese laid-pen patent publication No. 4-079483 discloses that both the lands and grooves are used for recording informations to increase the recording density by approximately two times of when only either the lands or the grooves used for recording informations.

It is also know as another conventional measure for improving the recording density to increase a numerical aperture of an objective lens performing as a condensing lens. The increase in the numerical aperture of the objective lens decreases a beam spot area on the optical disk, thereby improving the recording density.

For reproducing the information from the compact disk (CD), the numerical aperture is 0.45. For reproducing the information from the digital versatile disk (DVD), the numerical aperture is 0.6. In recent years, an optical disk with a high numerical aperture of 0.85 has been proposed.

The high numerical aperture for realizing the highly dense recording may decrease an acceptable range of an aberration which is caused by the fact that the normal of a surface of the disk is tilted from an optical axis of the condensed laser beam. For this reasons, it is preferable for the high numerical aperture that the substrate of the optical disk is thin. A substrate thickness for CD is 1.2 millimeters, whilst a substrate thickness for DVD is only 0.6 millimeters.

If the numerical aperture is increased up to at least 0.85, then after the recording layer has formed over the substrate, an light transmitting layer with a thickness of about 0.1 millimeter is then formed over the recording layer, so that a laser beam is irradiated through the light transmitting layer onto the recording layer for recording and reproducing the informations.

The combined use of the lands and the grooves for recording and reproducing the informations and the increase in the numerical aperture of the optical disk allow that the recording density is increased by about 4 to 5 times. This structure, however, causes the following disadvantages. FIG. 1 is a fragmentary cross sectional elevation view illustrative of a conventional structure of an optical storage medium allowing lands/grooves recordings. An medium 100 comprises a substrate 101, a reflective layer 102 over the substrate 101, a first dielectric layer 103 over the reflective layer 102, a recording layer 104 over the first dielectric layer 103, a second dielectric layer 105 over the recording layer 104, and an light transmitting layer 106 over the second dielectric layer 105.

The substrate 101 has substrate grooves 101a with a substrate groove width 110a and substrate lands 101b with a substrate land width 110b. The substrate groove width 110a is defined to be a distance between two intermediate points of adjacent substrate sloped surfaces defining the substrate groove 101a. The substrate land width 110b is defined to be another distance between two intermediate points of another adjacent substrate sloped surfaces defining the substrate land 101b. The substrate groove width 110a is equal to the substrate land width 110b.

The medium 100 has an effective groove width 111a and an effective land width 111b. The effective groove width 111a is defined to be a distance between two intermediate points of adjacent sloped surfaces of the recording layer 104. The effective land width 111b is defined to be another distance between two intermediate points of adjacent another sloped surfaces of the recording layer 104. Therefore, the effective groove width 111a is different from the substrate groove width 110a. The effective land width 111b is different from the substrate land width 110b. The effective groove width 111a is narrower than the substrate groove width 110a. The effective land width 111b is wider than the substrate land width 110b. Since the substrate groove width 110a is identical with the substrate land width 110b, the effective groove width 111a is narrower than the effective land width 111b.

A difference in width between the effective groove width 111a and the effective land width 111b is increased as a distance in vertical direction between the substrate 101 and the recording layer 104 is increased. The recording layer 104 is separated by double layers, for example, the reflective layer 102 and the first dielectric layer 103 from the substrate 101. Further, the reflective layer 102 is thick as being larger in step coverage than the first dielectric layer 103. Those results in that the distance in vertical direction between the substrate 101 and the recording layer 104 is relatively large.

Since the effective groove width 111a is narrower than the effective land width 111b, the following disadvantages are raised. Recording marks are formed on both grooves and lands of the recording layer 104. A signal amplification from the recording mark on the narrow groove of the recording layer 104 is smaller than another signal amplification from the other recording mark on the wide land of the recording layer 104. A difference in signal amplification between the recording marks on the narrow groove and the wide land of the recording layer 104 means it difficult for the conventional medium to obtain a desirable uniform quality of both signals from the groove recording mark and the land recording mark.

In the above circumstances, the development of a novel optical storage medium free from the above problems is desirable.

SUMMARY OF THE INVENTION

Accordingly, it is an object of the present invention to provide a novel optical storage medium free from the above problems.

It is a further object of the present invention to provide a novel optical storage medium for recording and reproducing informations onto and from both grooves and lands at a uniform signal quality.

It is a still further object of the present invention to provide a novel optical storage medium for recording and reproducing informations onto and from both grooves and lands, wherein the medium is suitable for a highly dense recording.

The present invention provides an optical storage medium including: a substrate having grooves and lands; a first dielectric layer overlying the substrate; a recording layer overlying the first dielectric layer; a second dielectric layer overlying the recording layer; and a light transmitting layer overlying the second dielectric layer, wherein each of the grooves is larger in width than adjacent two of the lands.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
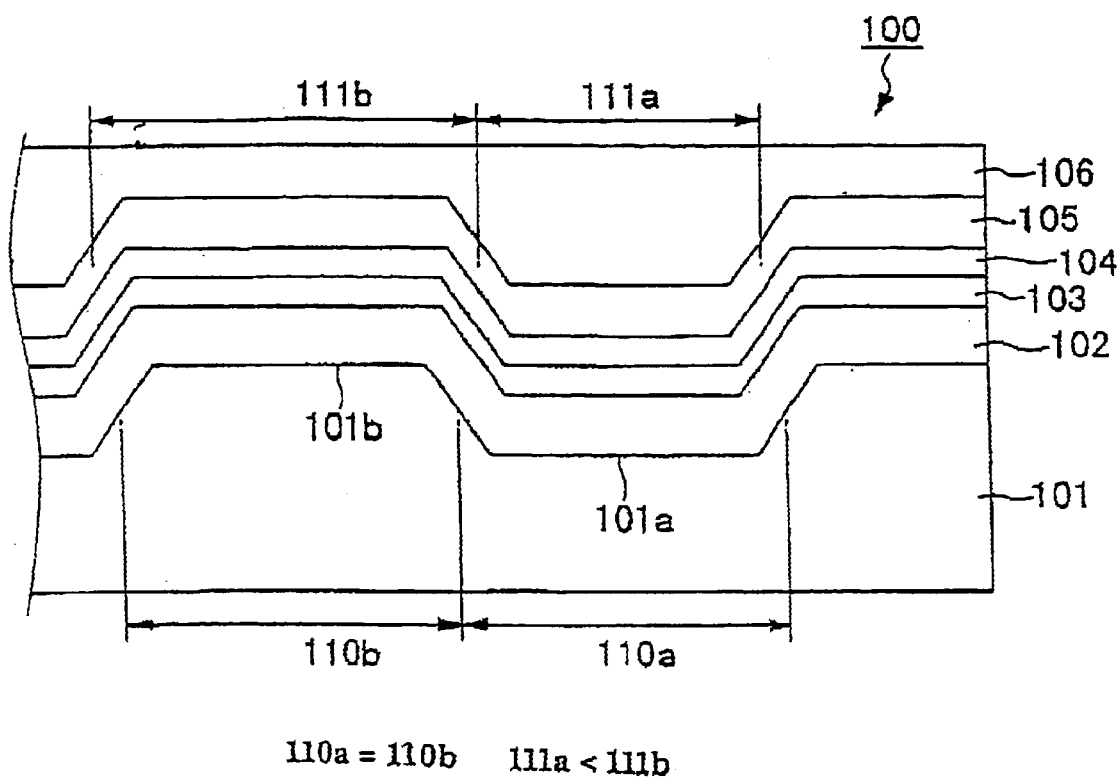
FIG. 1 is a fragmentary cross sectional elevation view illustrative of a conventional structure of an optical storage medium allowing lands/grooves recordings.

A first aspect of the present invention is a substrate structure for an optical storage medium including a recording layer. The substrate includes grooves and lands, wherein each of the grooves is larger in width than adjacent two of the lands.

It is preferable that a groove width $W_G$ of the grooves and a land width $W_L$ of the lands satisfy $0.0011d+0.06<2(W_G-W_L)/(W_G+W_L)<0.0011d+0.32$, where "d" is a distance between the substrate and the recording layer.

It is preferable that "d" is more than 50 nanometers and less than 300 nanometers.

It is further preferable that the groove width $W_G$ and the land width $W_L$ satisfy $0.0011d+0.036<2(W_G-W_L)/(W_G+W_L)<0.0011d+0.23$, where "d" is a distance between the substrate and the recording layer.

It is further more preferable that the groove width $W_G$ and the land width $W_L$ satisfy $2(W_G-W_L)/(W_G+W_L)=0.0011d+0.134$, where "d" is a distance between the substrate and the recording layer.

It is also preferable that all of the grooves have a uniform groove width, and all of the lands have a uniform land width, and the uniform groove width is larger than the uniform land width.

It is also preferable that a substrate groove width "$W_G$" of the grooves, a substrate land width "$W_L$" of the lands are set to satisfy the equation: $\omega<(W_G+W_L)<1.7\omega$, where "$\omega$" is a diameter of a laser beam spot on the optical storage medium.

A second aspect of the present invention is an optical storage medium including: a substrate having grooves and lands; a first dielectric layer overlying the substrate; a recording layer overlying the first dielectric layer; a second dielectric layer overlying the recording layer; and a light transmitting layer overlying the second dielectric layer, wherein each of the grooves is larger in width than adjacent two of the lands.

It is preferable that a groove width $W_G$ of the grooves and a land width $W_L$ of the lands satisfy $0.0011d-0.06<2(W_G-W_L)/(W_G+W_L)<0.0011d+0.32$, where "d" is a distance between the substrate and the recording layer.

It is also preferable that "d" is more than 50 nanometers and less than 300 nanometers.

It is further preferable that the groove width $W_G$ and the land width $W_L$ satisfy $0.0011d+0.036<2(W_G-W_L)/(W_G+W_L)<0.0011d+0.23$, where "d" is a distance between the substrate and the recording layer.

It is further more preferable that the groove width $W_G$ and the land width $W_L$ satisfy $2(W_G-W_L)/(W_G+W_L)=0.0011d+0.134$, where "d" is a distance between the substrate and the recording layer.

It is also preferable that all of the grooves have a uniform groove width, and all of the lands have a uniform land width, and the uniform groove width is larger than the uniform land width.

It is also preferable that a substrate groove width "$W_G$" of the grooves, a substrate land width "$W_L$" of the lands are set to satisfy the equation: $\omega<(W_G+W_L)<1.70\omega$, where "$\omega$" is a diameter of a laser beam spot on the optical storage medium.

First Embodiment

Figure 2:
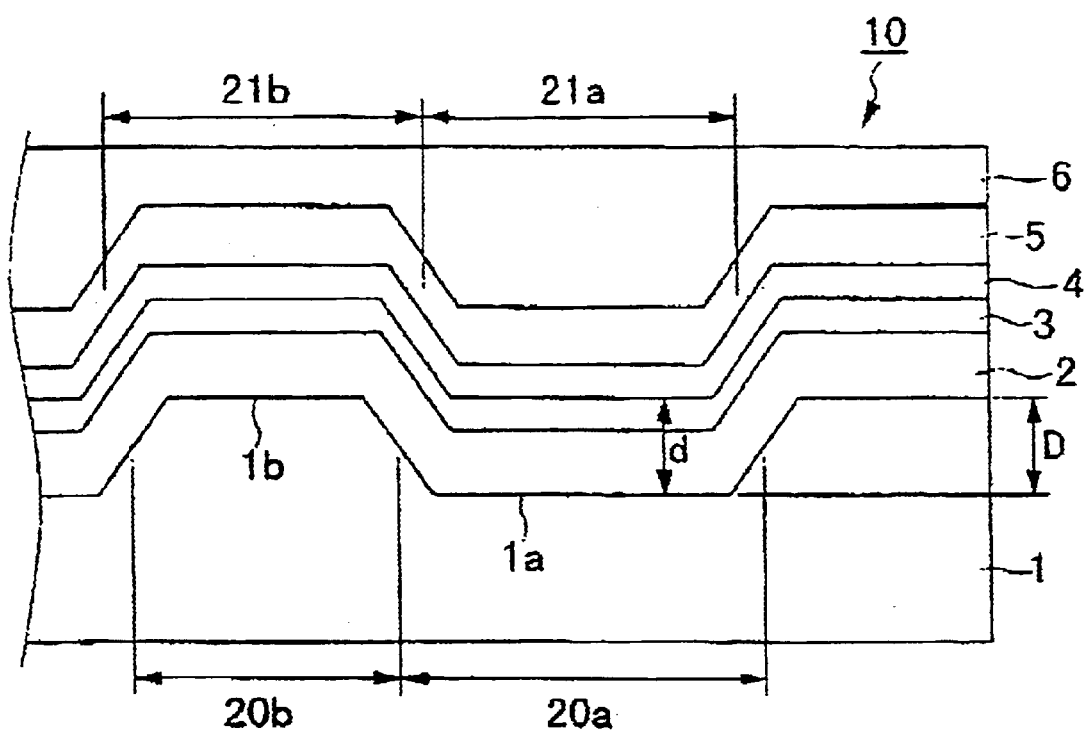
FIG. 2 is a fragmentary cross sectional elevation view illustrative of a novel structure of an optical storage medium allowing lands/grooves recordings in a first embodiment in accordance with the present invention.

A first embodiment according to the present invention will be described in detail with reference to the drawings. FIG. 2 is a fragmentary cross sectional elevation view illustrative of a novel structure of an optical storage medium allowing lands/grooves recordings in a first embodiment in accordance with the present invention. An optical storage medium 10 comprises a substrate 1, a reflective layer 2 over the substrate 1, a first dielectric layer 3 over the reflective layer 2, a recording layer 4 over the first dielectric layer 3, a second dielectric layer 5 over the recording layer 4, and a light transmitting layer 6 over the second dielectric layer 5.

The substrate 1 has substrate grooves 1a with a substrate groove width 20a and substrate lands 1b with a substrate land width 20b. The substrate groove width 20a is defined to be a distance between two intermediate points of adjacent substrate sloped surfaces defining the substrate groove 1a. The substrate land width 20b is defined to be another distance between two intermediate points of another adjacent substrate sloped surfaces defining the substrate land 1b. The substrate groove width 20a is wider than the substrate land width 20b.

The medium 10 has an effective groove width 21a and an effective land width 21b. The effective groove width 21a is defined to be a distance between two intermediate points of adjacent sloped surfaces of the recording layer 4. The effective land width 21b is defined to be another distance between two intermediate points of adjacent another sloped surfaces of the recording layer 4. Therefore, the effective groove width 21a is different from the substrate groove width 20a. The effective land width 21b is different from the substrate land width 20b. The effective groove width 21a is narrower than the substrate groove width 20a. The effective land width 21b is wider than the substrate land width 20b.

It is important for the present invention that the substrate groove width 20a is so wider than the substrate land width 20b that the effective groove width 21a is substantially identical with the effective land width 21b.

The substrate groove width 20a is so wider than the substrate land width 20b as to cause no difference in width between the effective groove width 21a and the effective land width 21b independently from the increase in the distance in vertical direction between the substrate 1 and the recording layer 4.

Since the effective groove width 21a is identical with the effective land width 21b, the above novel optical storage medium has the following advantages. Recording marks are formed on both grooves and lands of the recording layer 4. A signal amplification from the recording mark on the groove of the recording layer 4 is identical with another signal amplification from the other recording mark on the wide land of the recording layer 4. No difference in signal amplification between the recording marks on the groove and the land of the recording layer 104 means it easy for the novel medium to obtain a desirable uniform quality of both signals from the groove recording mark and the land recording mark.

In accordance with the present invention, as described above, the substrate groove width 20a is so wider than the substrate land width 20b that the effective groove width 21a is substantially identical with the effective land width 21b for obtaining the desirable uniform quality of both signals from the groove recording mark and the land recording mark.

In order to realize that the effective groove width 21a is substantially identical with the effective land width 21b, it may be possible to satisfy an equation:

$$2\times(W_G-W_L)/(W_G+W_L)=0.0011\times d+0.134$$

where "$W_G$" is the substrate groove width 20a, "$W_L$" is the substrate land width 20b, and "d" is the distance between the recording layer 4 and the semiconductor substrate 1. The distance "d" corresponds to the total thickness of the reflective layer 2 and the first dielectric layer 3. The substrate groove width 20a "$W_G$", the substrate land width 20b "$W_L$" and the distance "d" may preferably be set so as to satisfy the above equation.

The distance "d" is preferably in the range of 50 nanometers to 300 nanometers in the following viewpoints. If the reflective layer 2 is excessively thin, then the reflective layer 2 is insufficient in capability of absorbing a beat due to the laser beam from the recording layer 4 and allows a heat accumulation in the recording layer 4, thereby deteriorating the cyclic write characteristic. If the reflective layer 2 is excessively thick, then an adhesiveness of the reflective layer 2 to the semiconductor substrate 2 and also to the first dielectric layer 3 is deteriorated.

Further, it should be noted that if a difference in carrier level between the signals from the lands and the grooves of the recording layer 4 is small, for example, at most 2 dB, then an electrical compensation to this small difference may be available to obtain the uniform signal quality. The substrate groove width 20a "$W_G$", the substrate land width 20b "$W_L$" and the distance "d" may preferably be set so as to satisfy that the difference in carrier level between the signals from the lands and the grooves of the recording layer 4 is within 2 dB, even the above equation is not satisfied.

In order to satisfy that the difference in carrier level between the signals from the lands and the grooves of the recording layer 4 is within 2 dB, it is necessary that the substrate groove width 20a "$W_G$", the substrate land width 20b "$W_L$" and the distance "d" are set to satisfy another equation:

$$0.0011\times d-0.06<2\times(W_G-W_L)/(W_G+W_L)<0.0011\times d+0.32.$$

In order to satisfy that the difference in carrier level between the signals from the lands and the grooves of the recording layer 4 is within 1 dB, it is necessary that the substrate groove width 20a "$W_G$", the substrate land width 20b "$W_L$" and the distance "d" are set to satisfy another equation:

$$0.0011\times d+0.036<2\times(W_G-W_L)/(W_G+W_L)<0.0011\times d+0.23.$$

The above three equations were introduced based on the actual examinations by the present inventors. The examinations will be described below.

The above substrate 1 may comprise a disk shaped glass or a disk shaped resin, for example, polycarbonate. The substrate 1 may have a thickness in the range of 0.6 millimeters through 1.2 millimeters. The substrate 1 has a plurality of circular shaped grooves 1a co-axially aligned at a constant pitch in a radial direction. Adjacent two of the circular shaped grooves 1a are separated by a circular shaped land 1b. It is preferable that a depth "D" of the grooves 1a satisfies $\lambda/(8n)<D<\lambda/(5n)$ where $\lambda$ is the wavelength of the laser beam in the light transmitting layer, and "n" is the refractive index of the light transmitting layer. This depth range allows good tracking error signals. It is also possible to further increase the depth of the grooves 1a by an optically one cycle ($\lambda/(2n)$).

The reflective layer 2 is provided for reflecting a laser beam transmitted through the light transmitting layer 6. Al, Ti, Cr. Au, Cu, Ag and alloys thereof are available for the reflective layer 2. It is optionally possible to further interpose an adhesion layer between the reflective layer 2 and the substrate 1, wherein the adhesion layer may comprise a dielectric thin film or a metal thin film. A preferable range in thickness of the reflective layer 2 is 20 nanometers to 300 nanometers. In order to improve the cyclic write characteristic, it is effective that a heat of the laser beam in the recording and reproducing operations is adhered into the reflective layer 2, for this purpose the thickness of the reflective layer 2 is preferably at least 40 nanometers. An excess increase in the thickness of the reflective layer 2 may cause peeling of the reflective layer 2, for which reason the thickness of the reflective layer 2 is preferably at most 300 nanometers. In view of both the sufficient adhesiveness of the reflective layer 2 to the substrate 1 and the effective heat adhesion into the reflective layer 2 for cooling the recording layer 4, the thickness of the reflective layer 2 is preferably in the range of 100 nanometers to 200 nanometers.

Each of the first and second dielectric layers 3 and 5 may comprise a single layered structure or a multilayered structure. SiN, ZnS—SiO$_2$, Ta$_2$O$_5$, AlN and SiO$_2$ are available for each of the first and second dielectric layers 3 and 5. Thicknesses of the first and second dielectric layers 3 and 5 may be decided in consideration of optical characteristics and overwrite characteristics. A thickness of each of the first and second dielectric layers 3 and 5 may preferably be in the range of 10 nanometers to 100 nanometers, and more preferably in the range of 15 nanometers to 50 nanometers. An excess decrease in thickness of each of the first and second dielectric layers 3 and 5 may cause deterioration of the film quality thereof. An excess increase in thickness of each of the first and second dielectric layers 3 and 5 may cause an increase in film stress thereof.

A preferable thickness of the light transmitting layer 6 may be about 0.1 millimeter in view of reducing influences due to dusts. Glass materials, polycarbonate and ultraviolet ray thermosetting resins are, for example, available for the light transmitting layer 6.

Phase-variable compounds, for example, GeSbTe, InSbTe, AgInSbTe, and also optical magnetic materials, for example, TbFeCo are available for the recording layer 4. TeOx and coloring materials are also available for the recording layer 4.

Any available methods, for example, a sputtering method or an evaporation method are available for forming the first and second dielectric layers 3 and 5, the recording layer 4 and the reflective layer 2. A spin coating method is available for forming the light transmitting layer 6.

Examination 1

An optical storage medium was prepared with varying groove widths and a uniform groove pitch which corresponds to a land width. A polycarbonate disk substrate was prepared which have a uniform groove pitch of 0.6 micrometers, a uniform groove depth of 40 nanometers, and a uniform thickness of 1.2 millimeters. An Al—Ti reflective layer having a thickness of 100 nanometers is formed on the polycarbonate disk substrate. A first dielectric layer of ZnS—SiO$_2$ having a thickness of 20 nanometers is formed on the Al—Ti reflective layer. A recording layer of Ge$_2$Sb$_2$Te$_5$ having a thickness of 13 nanometers is formed on the first dielectric layer of ZnS—SiO$_2$. A second dielectric layer of ZnS—SiO$_2$ having a thickness of 80 nanometers is formed on the recording layer. Those layers may be deposited by a sputtering method. An ultraviolet ray thermosetting resin layer having a thickness of 0.1 millimeter is formed on the second dielectric layer. An optical storage medium of type "4A" was prepared. The substrate of the optical storage medium of type "A" has a uniform groove pitch of 0.6 micrometers and varying groove widths from 0.3 nanometers to 0.4 micrometers.

A total thickness of the reflective layer 2 and the first dielectric layer 3 is 120 nanometers. This total thickness corresponds to a distance between the substrate 1 and the recording layer 4.

Figure 3:
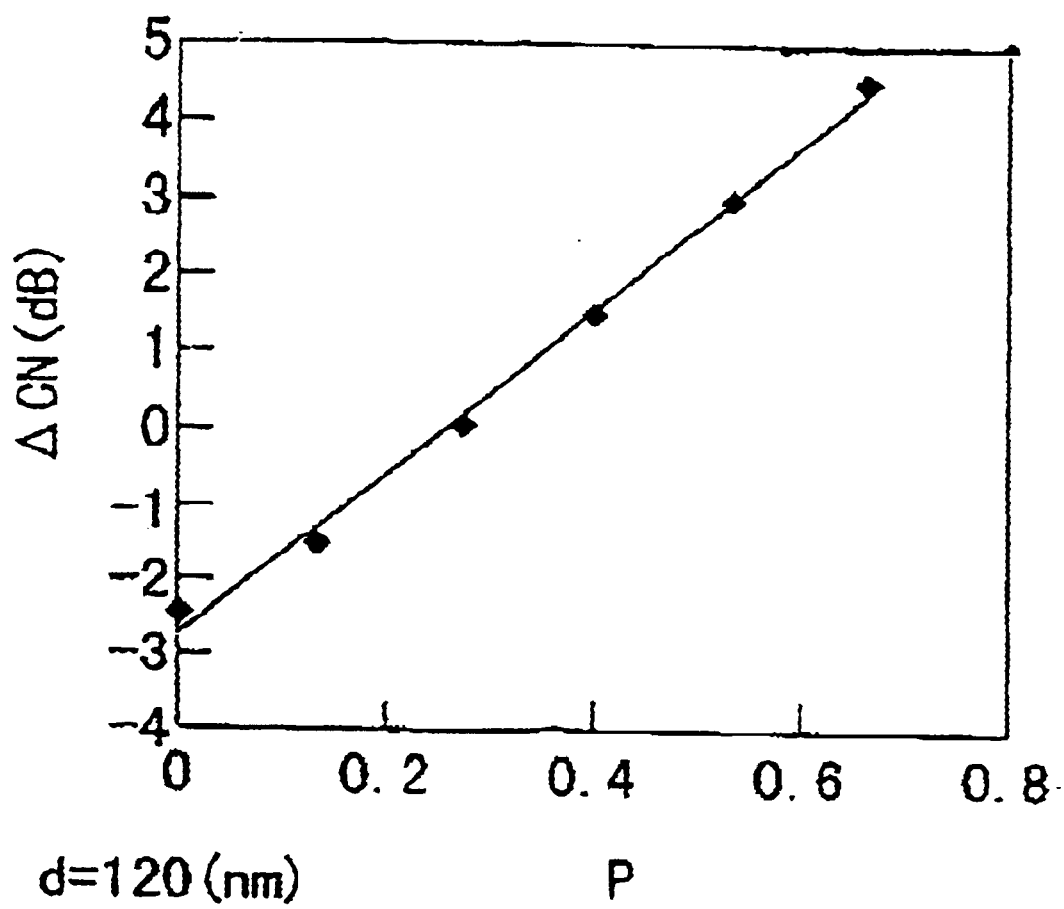
FIG. 3 is a diagram illustrative of variations in measured carrier levels on grooves and lands over groove with and land width in examination 1 of the present invention.

The optical storage medium of type "A" was fixed to a spindle to rotate the same at 5 m/s. A light head of a wavelength of 405 nanometers and a numerical aperture of 0.85 is used for recording a signal with a recording frequency of 4 MHz and a duty ratio of 50% into both the grooves and the lands. At positions, where the groove width is ranged from 0.3 micrometers to 0.4 micrometers, carrier levels on the grooves and the lands were measured. FIG. 3 is a diagram illustrative of variations in measured carrier levels on grooves and lands over groove with and land width in examination 1 of the present invention. A horizontal axis or an X-axis represents a parameter "P" given by: P=2(W$_G$−W$_L$)/(W$_G$+W$_L$), where W$_G$ is the groove width and W$_L$ is the land width. A vertical axis or an Y-axis represents a difference ΔCN in carrier level between the signal on the groove and the signal on the lands. The carrier level difference ΔCN is proportional to the parameter "P". As the parameter "P" is increased, then the carrier level difference ΔCN is also increased linearly from minus value to plus value. If the carrier level difference ΔCN is 0, then this means that the carrier levels of the signals from the groove and the lands are identical to each other. As a difference between the groove width and the land width is increased from zero, then the carrier level difference ΔCN becomes zero, wherein the groove width and the land width are optimum values. As the difference between the groove width and the land width is further increased, then the carrier level difference ΔCN is increased from zero.

Of course, it is preferable that the carrier level difference ΔCN is zero. If the carrier level difference ΔCN small, for example, at most 2 dB, then an electrical compensation to this small carrier level difference ΔCN may be available to obtain the uniform signal quality. It was confirmed from FIG. 3 that if the absolute value of the carrier level difference ΔCN is less than 2 dB, then the parameter "P" satisfies 0.06<P<0.45.

Examination 2

An optical storage medium was prepared with varying groove widths and a uniform groove pitch which corresponds to a land width. A polycarbonate disk substrate was prepared which have a uniform groove pitch of 0.6 micrometers, a uniform groove depth of 40 nanometers, and a uniform thickness of 1.2 millimeters. An Al—Ti reflective layer having a thickness of 170 nanometers is formed on the polycarbonate disk substrate. A first dielectric layer of ZnS—SiO$_2$ having a thickness of 20 nanometers is formed on the Al—Ti reflective layer. A recording layer of Ge$_2$Sb$_2$Te$_5$ having a thickness of 13 nanometers is formed on the first dielectric layer of ZnS—SiO$_2$. A second dielectric layer of ZnS—SiO$_2$ having a thickness of 90 nanometers is formed on the recording layer. Those layers may be deposited by a sputtering method. An ultraviolet ray thermosetting resin layer having a thickness of 0.1 millimeter is formed on the second dielectric layer. An optical storage medium of type "B" was prepared. The substrate of the optical storage medium of type "B" has a uniform groove pitch of 0.6 micrometers and varying groove widths from 0.3 nanometers to 0.4 micrometers.

A total thickness of the reflective layer 2 and the first dielectric layer 3 is 190 nanometers. This total thickness corresponds to a distance between the substrate 1 and the recording layer 4.

Figure 4:
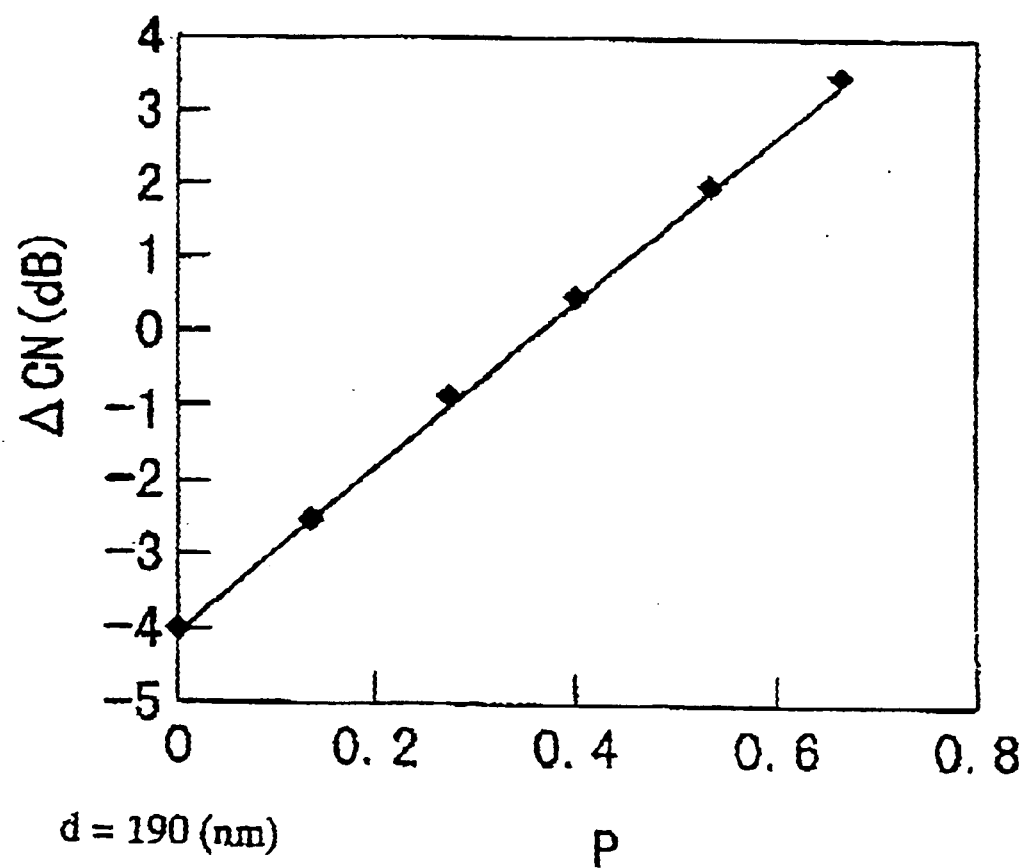
FIG. 4 is a diagram illustrative of variations in measured carrier levels on grooves and lands over groove with and land width in examination 2 of the present invention.

The optical storage medium of type "B" was fixed to a spindle to rotate the same at 5 m/s. A light head of a wavelength of 405 nanometers and a numerical aperture of 0.85 is used for recording a signal with a recording frequency of 4 MHz and a duty ratio of 50% into both the grooves and the lands. At positions, where the groove width is ranged from 0.3 micrometers to 0.4 micrometers, carrier levels on the grooves and the lands were measured. FIG. 4 is a diagram illustrative of variations in measured carrier levels on grooves and lands over groove with and land width in examination 2 of the present invention. A horizontal axis or an X-axis represents a parameter "P" given by: P=2(W$_G$−W$_L$)/(W$_G$+W$_L$), where W$_G$ is the groove width and W$_L$ is the land width. A vertical axis or an Y-axis represents a difference ΔCN in carrier level between the signal on the groove and the signal on the lands. The carrier level difference ΔCN is proportional to the parameter "P". As the parameter "P" is increased, then the carrier level difference ΔCN is also increased linearly from minus value to plus value. If the carrier level difference ΔCN is 0, then this means that the carrier levels of the signals from the groove and the lands are identical to each other. As a difference between the groove width and the land width is increased from zero, then the carrier level difference ΔCN becomes zero, wherein the groove width and the land width are optimum values. As the difference between the groove width and the land width is further increased, then the carrier level difference ΔCN is increased from zero.

Of course, it is preferable that the carrier level difference ΔCN is zero. If the carrier level difference ΔCN small, for example, at most 2 dB, then an electrical compensation to this small carrier level difference ΔCN may be available to obtain the uniform signal quality. It was confirmed from FIG. 4 that if the absolute value of the carrier level difference ΔCN is less than 2 dB, then the parameter "P" satisfies 0.2<P<0.54.

Examination 3

An optical storage medium was prepared with varying groove widths and a uniform groove pitch which corresponds to a land width. A polycarbonate disk substrate was prepared which have a uniform groove pitch of 0.6 micrometers, a uniform groove depth of 40 nanometers, and a uniform thickness of 1.2 millimeters. An Al—Ti reflective layer having a thickness of 40 nanometers is formed on the polycarbonate disk substrate. A first dielectric layer of ZnS—SiO$_2$ having a thickness of 15 nanometers is formed on the Al—Ti reflective layer. A recording layer of Ge$_2$Sb$_2$Te$_5$ having a thickness of 13 nanometers is formed on the first dielectric layer of ZnS—SiO$_2$. A second dielectric layer of ZnS—SiO$_2$ having a thickness of 60 nanometers is formed on the recording layer. Those layers may be deposited by a sputtering method. An ultraviolet ray thermosetting resin layer having a thickness of 0.1 millimeter is formed on the second dielectric layer. An optical storage medium of type "C" was prepared. The substrate of the optical storage medium of type "C" has a uniform groove pitch of 0.6 micrometers and varying groove widths from 0.3 nanometers to 0.4 micrometers.

A total thickness of the reflective layer 2 and the first dielectric layer 3 is 55 nanometers. This total thickness corresponds to a distance between the substrate 1 and the recording layer 4.

Figure 5:
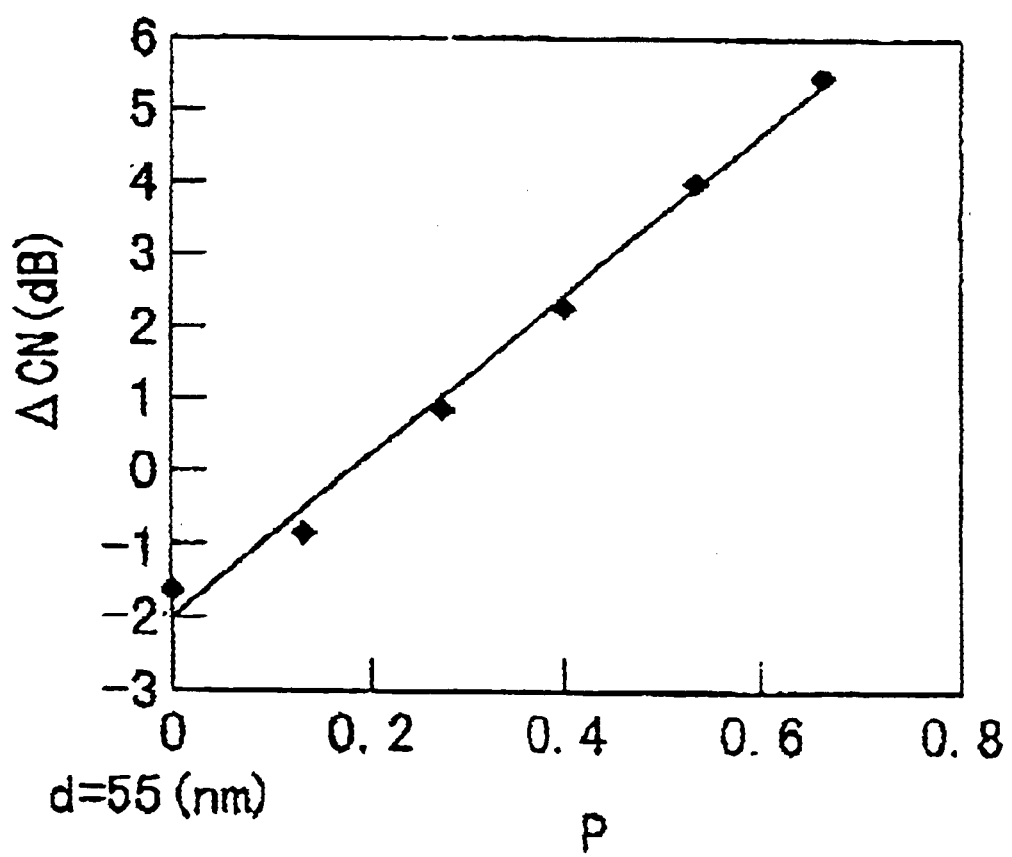
FIG. 5 is a diagram illustrative of variations in measured carrier levels on grooves and lands over groove with and land width in examination 3 of the present invention.

The optical storage medium of type "C" was fixed to a spindle to rotate the same at 5 m/s. A light head of a wavelength of 405 nanometers and a numerical aperture of 0.85 is used for recording a signal with a recording frequency of 4 MHz and a duty ratio of 50% into both the grooves and the lands. At positions, where the groove width is ranged from 0.3 micrometers to 0.4 micrometers, carrier levels on the grooves and the lands were measured. FIG. 5 is a diagram illustrative of variations in measured carrier levels on grooves and lands over groove with and land width in examination 3 of the present invention. A horizontal axis or an X-axis represents a parameter "P" given by: $P=2(W_G-W_L)/(W_G+W_L)$, where $W_G$ is the groove width and $W_L$ is the land width. A vertical axis or an Y-axis represents a difference ΔCN in carrier level between the signal on the groove and the signal on the lands. The carrier level difference ΔCN is proportional to the parameter "P". As the parameter "P" is increased, then the carrier level difference ΔCN is also increased linearly from minus value to plus value. If the carrier level difference ΔCN is 0, then this means that the carrier levels of the signals from the groove and the lands are identical to each other. As a difference between the groove width and the land width is increased from zero, then the carrier level difference ΔCN becomes zero, wherein the groove width and the land width are optimum values. As the difference between the groove width and the land width is further increased, then the carrier level difference ΔCN is increased from zero.

Of course, it is preferable that the carrier level difference ΔCN is zero. If the carrier level difference ΔCN small, for example, at most 2 dB, then an electrical compensation to this small carrier level difference ΔCN may be available to obtain the uniform signal quality. It was confirmed from FIG. 5 that if the absolute value of the carrier level difference ΔCN is less than 2 dB, then the parameter "P" satisfies 0.02<P<0.37.

Examination 4

An optical storage medium was prepared with varying groove widths and a uniform groove pitch which corresponds to a land width. A polycarbonate disk substrate was prepared which have a uniform groove pitch of 0.6 micrometers, a uniform groove depth of 40 nanometers, and a uniform thickness of 1.2 millimeters. An Al—Ti reflective layer having a thickness of 250 nanometers is formed on the polycarbonate disk substrate. A first dielectric layer of ZnS—SiO$_2$ having a thickness of 30 nanometers is formed on the Al—Ti reflective layer. A recording layer of Ge$_2$Sb$_2$Te$_5$ having a thickness of 13 nanometers is formed on the first dielectric layer of ZnS—SiO$_2$. A second dielectric layer of ZnS—SiO$_2$ having a thickness of 80 nanometers is formed on the recording layer. Those layers may be deposited by a sputtering method. An ultraviolet ray thermosetting resin layer having a thickness of 0.1 millimeter is formed on the second dielectric layer. An optical storage medium of type "D" was prepared. The substrate of the optical storage medium of type "D" has a uniform groove pitch of 0.6 micrometers and varying groove widths from 0.3 nanometers to 0.4 micrometers.

A total thickness of the reflective layer 2 and the first dielectric layer 3 is 280 nanometers. This total thickness corresponds to a distance between the substrate 1 and the recording layer 4.

Figure 6:
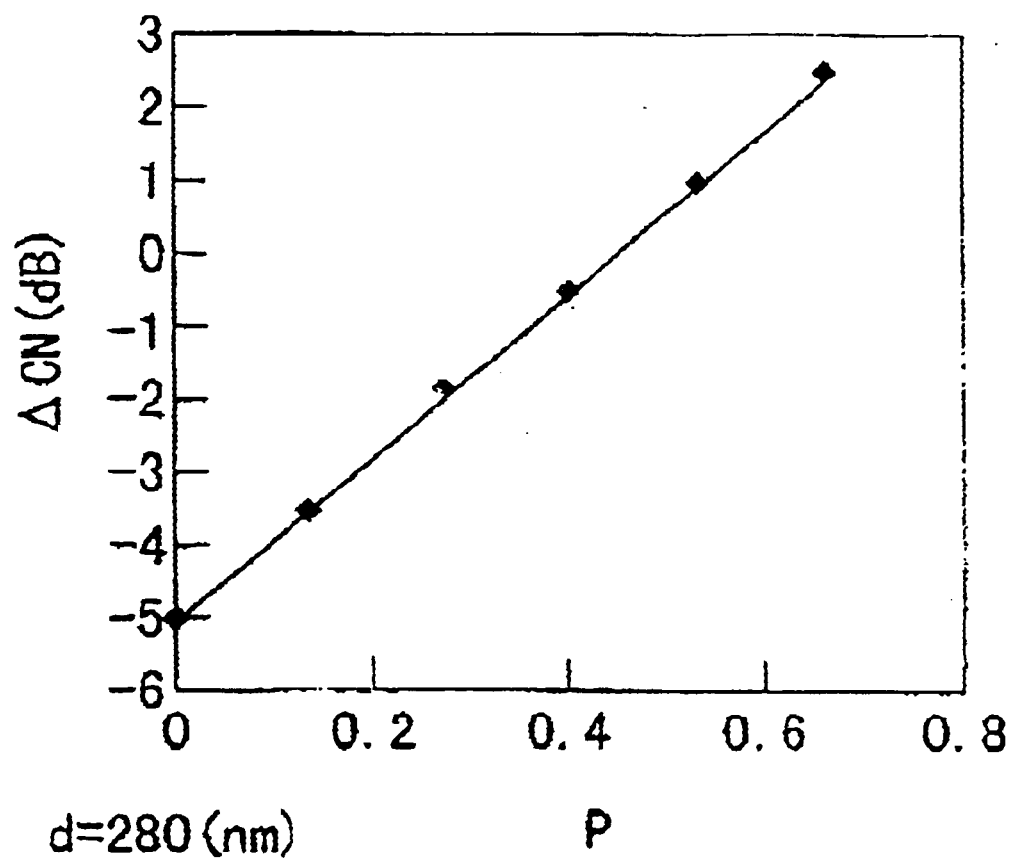
FIG. 6 is a diagram illustrative of variations in measured carrier levels on grooves and lands over groove with and land width in examination 4 of the present invention.

The optical storage medium of type "D" was fixed to a spindle to rotate the same at 5 m/s. A light bead of a wavelength of 405 nanometers and a numerical aperture of 0.85 is used for recording a signal with a recording frequency of 4 MHz and a duty ratio of 50% into both the grooves and the lands. At positions, where the groove width is ranged from 0.3 micrometers to 0.4 micrometers, carrier levels on the grooves and the lands were measured. FIG. 6 is a diagram illustrative of variations in measured carrier levels on grooves and lands over groove with and land width in examination 4 of the present invention. A horizontal axis or an X-axis represents a parameter "P" given by: $P=2(W_G-W_L)/(W_G+W_L)$, where $W_G$ is the groove width and $W_L$ is the land width. A vertical axis or an Y-axis represents a difference ΔCN in carrier level between the signal on the groove and the signal on the lands. The carrier level difference ΔCN is proportional to the parameter "P". As the parameter "P" is increased, then the carrier level difference ΔCN is also increased linearly from minus value to plus value. If the carrier level difference ΔCN is 0, then this means that the carrier levels of the signals from the groove and the lands are identical to each other. As a difference between the groove width and the land width is increased from zero, then the carrier level difference ΔCN becomes zero, wherein the groove width and the land width are optimum values. As the difference between the groove width and the land width is further increased, then the carrier level difference ΔCN is increased from zero.

Of course, it is preferable that the carries level difference ΔCN is zero. If the carrier level difference ΔCN small, for example, at most 2 dB, then an electrical compensation to this small carrier level difference ΔCN may be available to obtain the uniform signal quality. It was confirmed from FIG. 6 that if the absolute value of the carrier level difference ΔCN is less than 2 dB, then the parameter "P" satisfies 0.27<P<0.62.

Figure 7:
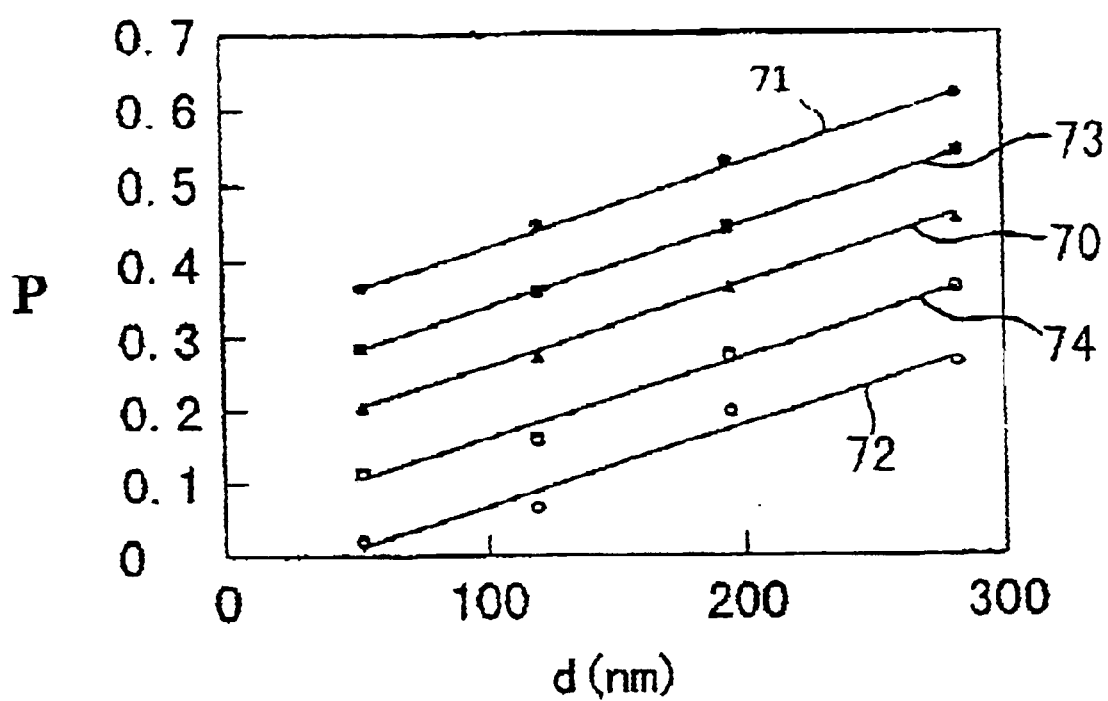
FIG. 7 is a diagram illustrative of variations of the parameter "P" over the distance "d" between the substrate and the recording layer for various carrier level differences $\Delta CN$.

Based on the above results of the examinations 1–4, a relationship of the parameter "P" and the distance "d" between the substrate and the recording layer was investigated. FIG. 7 is a diagram illustrative of variations of the parameter "P" over the distance "d" between the substrate and the recording layer for various carrier level differences ΔCN. A horizontal axis or an X-axis represents the distance "d" between the substrate and the recording layer. A vertical axis or an Y-axis represents the parameter "P" given by: $P=2(W_G-W_L)/(W_G+W_L)$, where $W_G$ is the groove width and $W_L$ is the land width. ● with "71" represents an approximated line at the carrier level difference ΔCN=2. ■ with "73" represents another approximated line at the carrier level difference ΔCN=1. ▲ with "70" represents another approximated line at the carrier level difference ΔCN=0. □ with "74" represents another approximated line at the carrier level difference ΔCN=−1. ○ with "72" represents an approximated line at the carrier level difference ΔCN=−2.

If the carrier level difference ΔCN is fixed, then the parameter "P" is proportional to the distance "d" between the substrate and the recording layer. As the distance "d" between the substrate and the recording layer is increased, then the parameter "P" is also increased. The approximated line marked with "70" at the carrier level difference ΔCN=0 satisfies a relationship between the parameter "P" and the distance "d" given by P=0.0011d+0.134. The approximated line marked with "71" at the carrier level difference ΔCN=2 satisfies another relationship between the parameter "P" and the distance "d" given by P=0.0011d+0.32. The approximated tine marked with "72" at the carrier level difference ΔCN=−2 satisfies another relationship between the parameter "P" and the distance "d" given by P=0.0011d−0.06. The approximated line marked with "73" at the carrier level difference ΔCN=1 satisfies another relationship between the parameter "P" and the distance "d" given by P=0.0011d+0.23. The approximated line marked with "74" at the carrier level difference ΔCN=−1 satisfies another relationship between the parameter "P" and the distance "d" given by P=0.0011d+0.036.

In order to obtain the carrier level difference ΔCN=0, it is necessary that the substrate groove width "$W_G$", the substrate land width "$W_L$" and the distance "d" between the substrate and the recording layer are set to satisfy the equation: P=0.0011d+0.134, where the parameter "P" is given by: $P=2(W_G-W_L)/(W_G+W_L)$. In this case, the uniform carrier levels of the signals from the grooves and the lands of the optical storage medium can be obtained without any electrical compensation.

In order to obtain the absolute value of the carrier level difference |ΔCN|<2, it is necessary that the substrate groove width "$W_G$", the substrate land width "$W_L$" and the distance "d" between the substrate and the recording layer are set to satisfy the equation: 0.0011d−0.06<P<0.0011d+0.32, where the parameter "P" is given by: $P=2(W_G-W_L)/(W_G+W_L)$. In this case, the uniform carrier levels of the signals from the grooves and the lands of the optical storage medium can be obtained with an electrical compensation thereto.

In order to obtain the absolute value of the carrier level difference |ΔCN|<1, it is necessary that the substrate groove width "$W_G$", the substrate land width "$W_L$" and the distance "d" between the substrate and the recording layer are set to satisfy the equation: 0.0011d+0.036<P<0.0011d+0.23, where the parameter "P" is given by: $P=2(W_G-W_L)/(W_G+W_L)$. In this case, the uniform carrier levels of the signals from the grooves and the lands of the optical storage medium can be obtained with an electrical compensation thereto.

If the laser beam spot diameter on the optical storage medium is sufficiently larger than the substrate groove width 20a of the substrate 1, the carrier level difference ΔCN is not remarkably large even the effective groove width 21a and the effective land width 21b of the recording layer 4 are somewhat different from each other.

If the sum of the substrate groove width and the groove pitch corresponding to the land width ($W_G+W_L$) is sufficiently larger than the laser beam spot diameter "ω" on the optical storage medium, then the recording marks are smaller than the groove width and the land width, for which reason the recording marks are uniform in size or width independent from the difference between the groove width and the land width, resulting in no difference in carrier level of the signals from the recording marks on the grooves and the lands.

In order to obtain the zero carrier level difference, it is necessary that the substrate groove width "$W_G$", the substrate land width "$W_L$" are set to satisfy the equation: $\omega<(W_G+W_L)<1.7\omega$.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A substrate structure for an optical storage medium including a recording layer, said substrate including grooves and lands, wherein each of said grooves is larger in width than adjacent two of said ands, and wherein a groove width $W_G$ of said grooves and a land width $W_L$ of said lands satisfy $0.0011d-0.06<2(W_G-W_L)/(W_G+W_L)<0.0011d+0.32$, where "d" is a distance between said substrate and said recording layer.

2. The substrate structure as claimed in claim 1, wherein "d" is more than 50 nanometers and less than 300 nanometers.

3. The substrate structure as claimed in claim 1, wherein said groove width $W_G$ and said land width $W_L$ satisfy $0.011d+0.036<2(W_G-W_L)/(W_G+W_L)<0.0011d+0.23$, where "d" is a distance between said substrate and said recording layer.

4. The substrate structure as claimed in claim 3, wherein said groove width $W_G$ and said land width $W_L$ satisfy $2(W_G-W_L)/(W_G+W_L)=0.0011d+0.134$, where "d" is a distance between said substrate and said recording layer.

5. The substrate structure as claimed in claim 1, wherein all of said grooves have a uniform groove width, and all of said lands have a uniform land width, and said uniform groove width is larger than said uniform land width.

6. A substrate structure for an optical storage medium including a recording layer, said substrate including grooves and lands, wherein each of said grooves is larger in width than adjacent two of said lands, and wherein a substrate groove width "$W_G$" of said grooves, a substrate land width "$W_L$" of said lands are set to satisfy the equation: $\omega<(W_G+W_L)<1.7\omega$, where "ω" is a diameter of a laser beam spot on said optical storage medium.

7. An optical storage medium including:
a substrate having grooves and lands;
a first dielectric layer overlying said substrate;
a recording layer overlying said first dielectric layer;
a second dielectric layer overlying said recording layer; and
a light transmitting layer overlying said second dielectric layer,
wherein each of said grooves is larger in width than adjacent two of said lands, and
wherein a groove width $W_G$ of said grooves and a land width $W_L$ of said lands satisfy $0.0011d-0.06<2(W_G-W_L)/(W_G+W_L)<0.0011d+0.32$, where "d" is a distance between said substrate and said recording layer.

8. The optical storage medium as claimed in claim 7, wherein "d" is more than 50 nanometers and less than 300 nanometers.

9. The optical storage medium as claimed in claim 7, wherein said groove width $W_G$ and said land width $W_L$ satisfy $0.0011d+0.036<2(W_G-W_L)/(W_G+W_L)<0.0011d+0.23$, where "d" is a distance between said substrate and said recording layer.

10. The optical storage medium as claimed in claim 9, wherein said groove width $W_G$ and said land width $W_L$ satisfy $2(W_G-W_L)/(W_G+W_L)=0.0011d+0.134$, where "d" is a distance between said substrate and said recording layer.

11. The optical storage medium as claimed in claim 7, wherein all of said grooves have a uniform groove width, and all of said lands have a uniform land width, and said uniform groove width is larger than said uniform land width.

12. The optical storage medium as claimed in claim 7, wherein said substrate groove width "$W_G$" of said grooves, said substrate land width "$W_L$" of said lands are set to satisfy the equation: $\omega<(W_G+W_L)<1.7\omega$, where "$\omega$" is a diameter of a laser beam spot on said optical storage medium.

13. An optical storage medium including:
a substrate having grooves having a uniform groove width $W_G$ and lands having a uniform land width $W_L$;
a first dielectric layer overlying said substrate;
a recording layer overlying said first dielectric layer;
a second dielectric layer overlying said recording layer; and
a light transmitting layer overlying said second dielectric layer,
wherein sad groove width $W_G$ and said land width $W_L$ satisfy $0.0011d-0.06<2(W_G-W_L)/(W_G+W_L)<0.0011d+0.32$, where "d" is a distance between said substrate and said recording layer.

14. The optical storage medium as claimed in claim 13, wherein "d" is more than 50 nanometers and less than 300 nanometers.

15. The optical storage medium as claimed in claim 13, wherein said groove width $W_G$ and said land width $W_L$ satisfy $0.0011d+0.036<2(W_G-W_L)/(W_G+W_L)<0.0011d+0.23$, where "d" is a distance between said substrate and said recording layer.

16. The optical storage medium as claimed in claim 15, wherein said groove width $W_G$ and said land width $W_L$ satisfy $2(W_G-W_L)/(W_G+W_L)=0.0011d+0.134$, where "d" is a distance between said substrate and said recording layer.

17. The optical storage medium as claimed in claim 13, wherein a substrate groove width "$W_G$" of said grooves, a substrate land width "$W_L$" of said lands are set to satisfy the equation: $\omega<(W_G+W_L)<1.7\omega$, where "$\omega$" is a diameter of a laser spot on said optical storage medium.

18. The substrate structure as claimed in claim 1,
wherein the recording layer has effective grooves and effective lands, and
wherein each of said effective grooves is substantially identical in width with said effective lands.

* * * * *